Feb. 14, 1933.                J. G. CAPSTAFF                1,897,837
                           COLOR CINEMATOGRAPHY
                            Filed July 21, 1930

John G. Capstaff,
                    Inventor,

By  N. M. Perrins
                        Attorney

Patented Feb. 14, 1933

1,897,837

UNITED STATES PATENT OFFICE

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK

COLOR CINEMATOGRAPHY

Application filed July 21, 1930. Serial No. 469,507.

This invention relates to photography and more particularly to the taking of motion pictures in color.

According to one method of preparing motion pictures in color, the picture is taken on two superimposed films each sensitized for a different region of the spectrum, preferably to one of the primary colors such as red or green. The two negatives thus prepared may then be used in the well-known manner to prepare a colored positive film.

In the taking of such motion pictures on superimposed films it is of utmost importance that optical contact be maintained between the adjacent film surfaces while they are being exposed in the camera, since otherwise the light rays, which are somewhat diffused in passing through the emulsion of the first film, will form a poorly defined image on the second emulsion.

To overcome this difficulty, it has been proposed to modify the motion picture camera using such films by attaching to the gate thereof a pressure block which forces the two films into engagement. Such an arrangement, however, tends to complicate the structure of the camera and introduces an undesirable drag on the two films due to the applied pressure.

In accordance with the present invention, it is proposed to maintain the desired intimate contact between the superimposed films without the need for such a pressure block, and to obtain this result merely by shaping the films transversely thereof in such a manner that they tend to engage each other closely during exposure. This result is achieved by using films that have been given a slight transverse curvature in the process of manufacture, more particularly this slight curvature is in the form of a slight convexity on the emulsion sides of the films. Thus when the edges of such films are forced into engagement during passage through the camera, their entire surface will be in intimate contact at the area of exposure.

Figure 1:
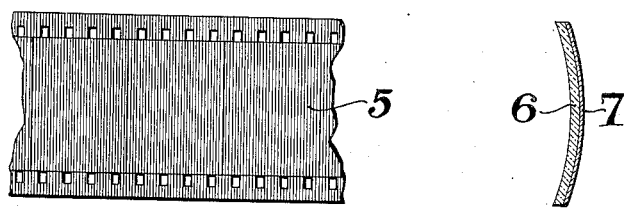
Figure 2:
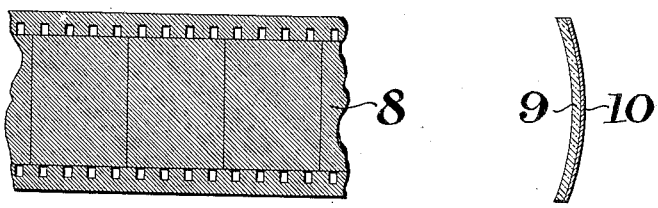
Figure 3:
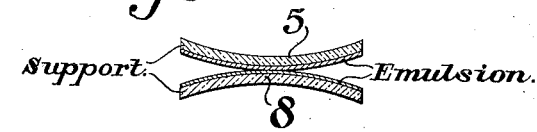
Figure 4:
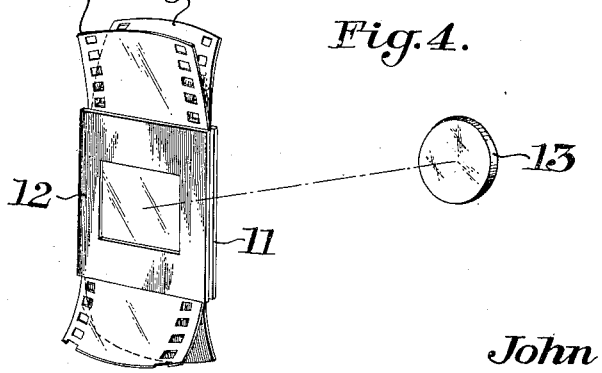

For a clearer understanding of the invention reference is made to the drawing in which Fig. 1 is a plane view of a film strip coated with emulsion sensitized to one color and also showing a cross section thereof. Fig. 2 is a similar plane view and cross sectional view of a film strip coated with emulsion sensitized to another color. Fig. 3 is an exaggerated cross sectional view showing the relation of these two film strips when threaded into a camera with their emulsion surfaces in engagement; and Fig. 4 is a perspective view of a portion of a camera showing means therein for holding the edges of the two film strips in engagement.

Referring to Fig. 1, 5 generally designates a piece of film strip comprising a support 6 coated with a layer 7 of emulsion which is sensitized to one color such as red. Fig. 2 represents a piece of film strip generally designated 8 comprising a support 9 coated with an emulsion 10 sensitive to a second color such as green. It will be noted from the sectional views of Figs. 1 and 2 that each film has an arcuate surface with its emulsion side slightly convex. This convexity of the emulsion surface may be obtained by molding the support or by causing the side of the support opposite the emulsion to shrink while the emulsion surface thereof is uneffected.

In using the present film for taking colored pictures the films 5 and 8 are threaded through a motion picture camera with the emulsion surfaces 7 and 10 facing each other as indicated in Fig. 3. The camera is provided with two framing members 11 and 12, one of which is preferably movable toward the other so that the edges of each frame of the film strips are held tightly in engagement in front of the lens 13 of the camera. Due to the convexity of the films 5 and 8, when pressure is applied to the two edges thereof, tending to flatten them, their center portions will be forced into intimate contact on account of the natural resistance of the films to the applied force. In this manner the two film strips are held in optical contact without complicated pressure mechanism.

The present disclosure is merely descriptive of one form of applicant's invention, and it is to be understood that there may be many modifications and variations within the scope of the pending claims without departing from the inventive concept.

What I claim is:

1. The method of maintaining two superimposed film strips with their engaging surfaces in intimate contact which comprises shaping said strips with their nearest surfaces convex, and forcing the edges of the strips into engagement.

2. The combination with two film strips each coated with emulsion, the emulsion of one strip being sensitized to one color and the other being sensitized to another color, said strips being convex on their emulsion sides, of means for holding the edges of said strips in engagement.

3. In a process for making motion pictures in color that includes passing two differentially sensitized film strips through an exposure gate with their emulsion faces in contact, the improved method of maintaining the surfaces intimately in contact that comprises forming each film strip with a permanent transverse bow convex to its emulsion surface and holding the borders of the strip in contact during such passage.

Signed at Rochester, New York, this 15th day of July, 1930.

JOHN G. CAPSTAFF.